United States Patent [19]

Pineo et al.

[11] Patent Number: 4,815,928
[45] Date of Patent: Mar. 28, 1989

[54] BLADE COOLING

[75] Inventors: Frederick J. Pineo, Hampton, N.H.; Jose T. Alvarez, Boxford, Mass.

[73] Assignee: General Electric Company, Cincinnati, Ohio

[21] Appl. No.: 732,012

[22] Filed: May 6, 1985

[51] Int. Cl.⁴ .............................................. F01D 17/00
[52] U.S. Cl. ..................... 415/17; 415/115; 416/37; 416/42; 60/39.29
[58] Field of Search ................... 415/115, 117, 47, 17, 415/28, 116; 416/95–97, 37, 42, 39; 60/39.29, 39.75; 73/144

[56] References Cited

U.S. PATENT DOCUMENTS

| | | | |
|---|---|---|---|
| 2,787,440 | 4/1957 | Thompson, Jr. | 416/39 |
| 3,937,014 | 2/1976 | Plant | 415/17 |
| 4,069,662 | 1/1978 | Redinger, Jr. et al. | 415/116 |
| 4,102,595 | 7/1978 | Wibbelsman | 415/28 |
| 4,164,033 | 8/1979 | Glennon et al. | 415/17 |
| 4,164,034 | 8/1979 | Glennon et al. | 415/17 |
| 4,217,755 | 8/1980 | Williams | 416/95 |
| 4,292,806 | 10/1981 | Moore et al. | 415/17 |
| 4,296,599 | 10/1981 | Adamson | 416/95 |
| 4,304,093 | 12/1981 | Schulze | 60/39.75 |
| 4,391,290 | 7/1983 | Williams | 60/39.75 |
| 4,416,111 | 11/1983 | Lenahan et al. | 60/39.29 |
| 4,487,016 | 12/1984 | Schwartz et al. | 60/39.75 |
| 4,668,162 | 5/1987 | Cederwall et al. | 415/115 |

FOREIGN PATENT DOCUMENTS

| | | |
|---|---|---|
| 2062763 | 5/1981 | United Kingdom . |
| 2078859 | 1/1982 | United Kingdom . |
| 2108586 | 5/1983 | United Kingdom . |
| 2160929 | 1/1986 | United Kingdom . |

Primary Examiner—Robert E. Garrett
Assistant Examiner—John T. Kwon
Attorney, Agent, or Firm—Derek P. Lawrence; Nathan D. Herkamp

[57] ABSTRACT

In one form of the present invention, turbine cooling air is modulated as a function of engine speed, altitude, and blade temperature.

6 Claims, 1 Drawing Sheet

ABSTRACT

BLADE COOLING

The Government has rights in this invention pursuant to Contract No. DAAK51-83-C-0014 awarded by the Department of the Army.

The present invention relates to the modulation of cooling airflow through turbine blades in a gas turbine engine. The modulation is a function of altitude, engine speed, and blade temperature.

BACKGROUND OF THE INVENTION

In a gas turbine engine, an extremely hot (about 2200° to 2500° F.) gas jet impinges upon a turbine, causing the turbine to spin and thereby do work. It is well known to cool the turbine blades by ducting an airflow through them internally. However, this ducting is expensive in the sense that the cooling airflow is diverted from a power-producing airflow. Therefore, it is desirable to reduce or eliminate turbine blade cooling when it is not needed.

OBJECTS OF THE INVENTION

It is an object of the present invention to provide modulation of turbine cooling in a gas turbine engine.

SUMMARY OF THE INVENTION

In one form of the present invention, turbine cooling air is modulated as a function of engine speed, altitude, and blade temperature.

DETAILED DESCRIPTION OF THE PRESENT INVENTION

Figure 1:
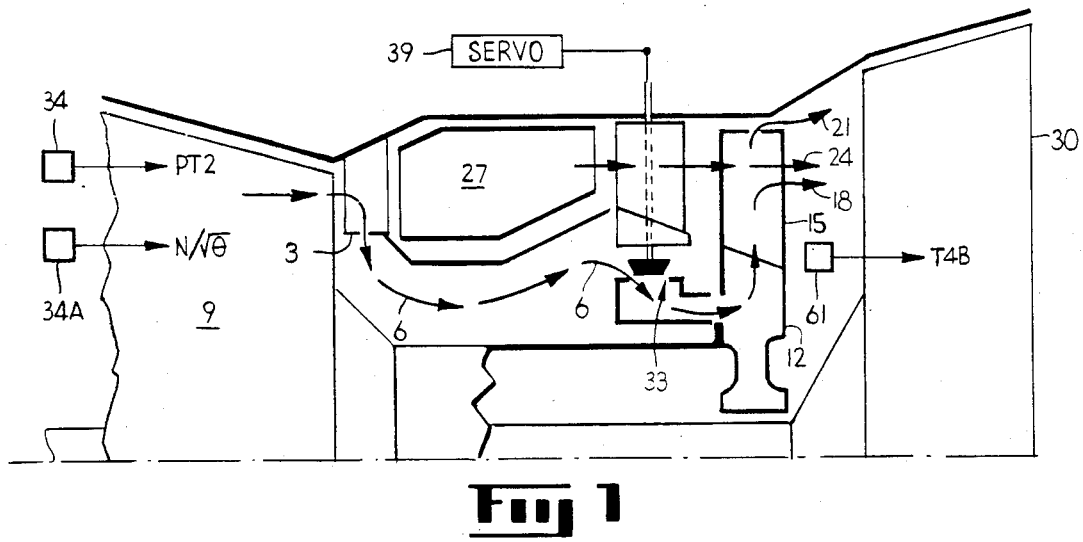
FIG. 1 illustrates a schematic of a gas turbine engine.

As shown in FIG. 1, a bleed 3 taps air 6 from a compressor 9 in a gas turbine engine and directs the air to a high pressure turbine 12. The air feeds through internal passages in the high pressure turbine, flows through turbine blades 15, and exits the blades through holes (not shown) as gas streams 18 and 21. Gas streams 18 and 21 join hot combustion gases 24 provided by a combustor 27 and the combined streams impinge upon a power turbine 30. The power turbine 30 can be connected to a shaft which, for example, drives a helicopter rotor.

The details of bleeding compressor air and ducting it to the high pressure turbine are not part of the present invention. Various fluid circuitry and mechanisms for bleeding compressor air and ducting it through the turbine blades 15 are known in the art. The present invention is concerned with controlling a valve 33 interconnected within the bleed path (indicated by arrows 6) to thereby modulate cooling flow.

Figure 2:
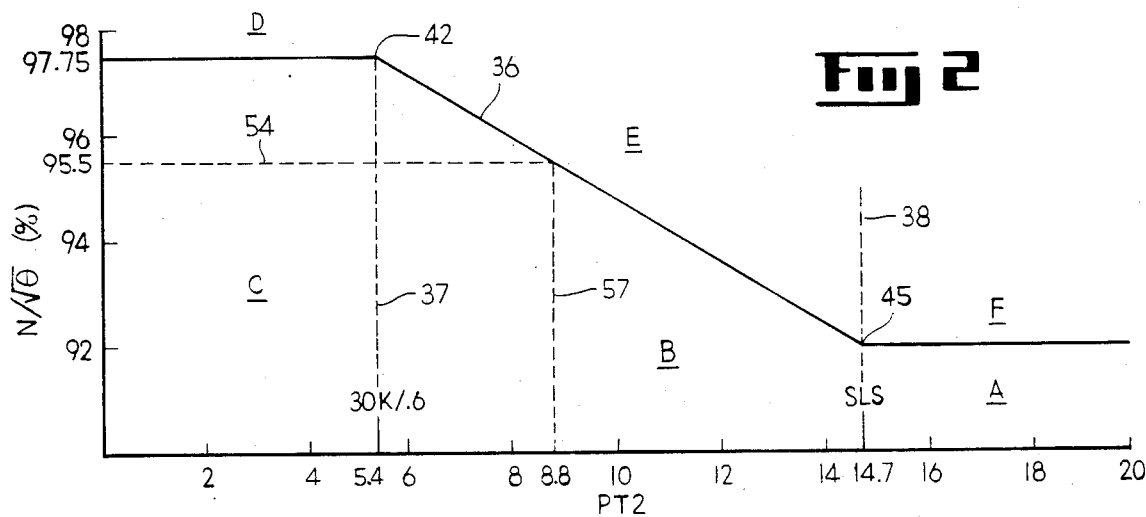
FIG. 2 illustrates a schedule based on corrected compressor sped ($N/\sqrt{\theta}$) vs total pressure at the compressor inlet (PT2).

FIG. 2 illustrates one schedule 36 used for controlling the valve 33 in FIG. 1. Total compressor inlet pressure (PT2, measured by pressure sensor 34 in FIG. 1) is plotted on the horizontal axis. PT2 in FIG. 2 represents, in a general sense, the altitude of the engine and, correspondingly, the air density of the cooling airstream. The lower PT2s correspond to a higher altitude and, or course, the higher PT2s to lower altitudes. These facts are true for subsonic aircraft applications. For the general case (including supersonic aircraft), a further input of flight Mach number can be used to determine the schedule. Implementation of such further input would be known in the art.

$N/\sqrt{\theta}$, on the vertical axis, represents the corrected engine speed ("speed") as is well defined in the art and measured by speed sensor 34A in FIG. 1. This speed is that expected for a nominally operative engine at a particular inlet pressure, PT2. The units of PT2 are psia, while the units of corrected speed are a percentage of rated speed. Schedule 36 gives a speed threshold as a function of PT2. The schedule 36 in FIG. 2 is divided into six regions by dashed lines 37 and 38. The regions are marked with the letters A-F.

When the engine operation has speed and PT2 data points which are below the schedule 36 (that is, in regions A–C) a servo 39 in FIG. 1 closes the valve 33. Conversely, when the engine is operating above the schedule 36 (that is in regions D-F) the servo 39 opens the valve.

The schedule 36 in FIG. 2 possesses three important features. One, at low altitudes (above PT2 of 14.7 psia, in region A), the valve is closed at all altitudes when corrected speed falls below 92%. One reason for this is that closing of the valve under these conditions will improve specific fuel consumption, chiefly by eliminating the diversion of airstream 6 in FIG. 1. Two, at high altitudes (below PT2 of 5.4, in region C), the valve is closed for all speeds below 97.75%. One reason for this is that an SFC rating point at, for example, a PT2 of 8 psia and speed of 94.5% requires that the valve be closed. The SFC rating point is dictated by the engine designer. Three, the schedule 36 is linear (forming a boundary between regions B and E) between the low speed, low altitude region and the high speed, high altitude regions (that is, a linear interpolation exists between points 42 and 45). The term "linear" means a straight line having an equation of the form $Y=MX+B$, where Y is the quantity on the vertical axis in FIG. 2, X is the quantity on the horizontal axis, and B is the Y-intercept.

Figure 3:
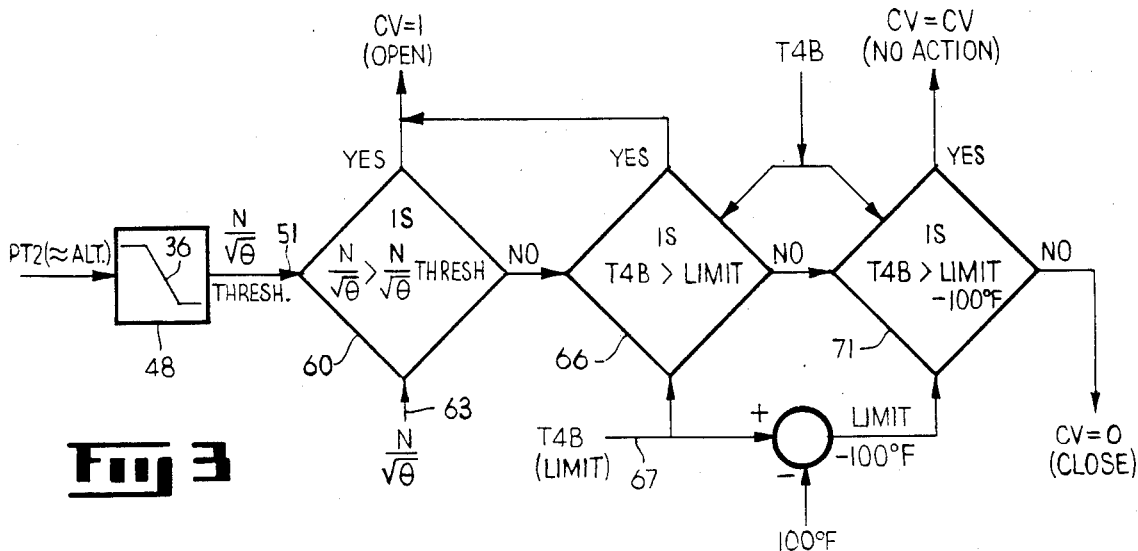
FIG. 3 illustrates a flow chart which describes the operation of one form of the present invention.

The present invention uses the schedule of FIG. 2 as follows. As shown in FIG. 3, PT2 is fed to a scheduling means 48 containing the schedule of FIG. 2. For the given PT2, the speed threshold (indicated as "'$N/\sqrt{\theta}$ THRESH") is obtained on line 51 as an output. For example, as shown in FIG. 2, PT2 may be 8.8, for which the threshold speed of about 95.5% is obtained as shown by dashed lines 54 and 57. This 95.5% corrected speed is present on line 51 in FIG. 3.

As shown by block 60, the actual corrected engine speed ($N/\sqrt{\theta}$), on line 63, is compared with the threshold speed on line 51. If actual speed exceeds threshold speed as shown by the symbol YES to the top of block 60, the cooling valve 33 is opened as indicated by the symbol CV=1. If actual speed does not exceed threshold speed, as indicated by the symbol NO to the right of block 60, then inquiry is made concerning the actual temperature ("T4B", measured by temperature sensor 61 in FIG. 1) of the turbine blades, as indicated by block 66.

A limiting temperature ("T4B LIMIT"), provided in advance by the engine designer, is present on line 67. Block 66 inquires whether the actual temperature exceeds the limit. If so, indicated by the symbol YES to the top of block 66, then the cooling valve 33 is opened as shown by the symbol CV=1. If actual temperature is below the limit, the logic proceeds to block 71 where inquiry is made whether the actual temperature is over 100° below the limit on line 67. (Block 71 phrases this inquiry as whether T4B is greater than the limit minus 100°.) A decision of NO, on the right of block 71, indicates that the blade is sufficiently cool, so that the cooling valve 33 is closed as indicated by the phrase CV=0. If the answer is YES, on the top of block 71, the cooling valve 33 position is unchanged ("CV=CV").

Block 71 introduces hysteresis protection into the system because, once the valve 33 is opened because of temperature (the decision YES on top of block 66 was obtained), the valve is not closed because of temperature until the temperature drops more than 100° F. below the limit T4B(LIMIT) (in which case the decision NO causes the result of CV=0). This hysteresis protection serves to prevent chatter when the actual turbine blade temperature TB4 is close to the limit T4B(LIMIT) on line 67.

The logic described in FIG. 3 can easily be implemented in a digital computer program. The pressure P2, speed $N/\sqrt{\theta}$, and temperature signals T4B and T4B(LIMIT) are in fact digital signals fed to the computer which runs the program and derived as known in the art. The program continually repeats the operations of blocks 48, 60, 66, and 71 during flight of the aircraft. The reader will note that whenever the logic exits the path (e.g., on the YES line above block 60), the logic restarts at block 48. This prevents such an anomaly as would occur when speed is above $N/\sqrt{\theta}$ THRESH but blade temperature is below T4B(LIMIT). If the logic did not exit on the YES line above block 60, then blocks 60 and 71 would merely open and close the valve 33 on a cyclic basis. The servo 39 is known in the art.

An invention has been described wherein the supply of compressor bleed air to cool the high pressure turbine is modulated in binary, on/off fashion: the valve 33 is either closed or open and no intermediate positions are contemplated. Further, the modulation is a function of altitude and engine speed (based on the schedule in FIG. 2) as well as upon temperature of the turbine blades. With the embodiment disclosed, operation in regions D–F in FIG. 2 results in valve opening for blade cooling, in region A–C results in valve closing for improved fuel consumption.

Numerous substitutions and modifications can be undertaken without departing from the true spirit and scope of the present invention. What is desired to be secured by Letters Patent is the invention as defined in the following claims.

We claim:

1. In the cooling airflow for turbine blades in a gas turbine aircraft engine, the improvement comprising: maintaining and terminating cooling airflow based upon aircraft altitude, engine speed, and blade temperature.

2. A method of controlling a cooling airflow for turbine blades in an aircraft, comprising the following steps:
   (a) establishing a schedule of engine threshold speeds comprising:
      (i) a first speed when the aircraft altitude is above a first predetermined altitude (42);
      (ii) a second speed when the aircraft is below a second predetermined altitude (45);
      (iii) a series of linearly interpolated speeds when the aircraft is between the first and second altitudes;
   (b) maintaining cooling air when the actual speed exceeds the threshold speed and, if not, then
   (c) maintaining cooling air when the blade temperature exceeds a predetermined limit and, if not, then
   (d) terminating cooling air when the blade temperature falls below the limit by a predetermined amount.

3. A method of controlling cooling air to turbine blades in a gas turbine aircraft engine, comprising the following steps:
   (a) defining a first data point (42) comprising a first predetermined engine speed and a first predetermined altitude;
   (b) defining a second data point (45) comprising a second predetermined engine speed and a second predetermined altitude;
   (c) linearly interpolating between the first and second data points; and
   (d) maintaining cooling airflow unless one of the following conditions occur, whereupon cooling airflow is terminated:
      (i) engine speed is below the first predetermined engine speed and the aircraft is above the first predetermined altitude;
      (ii) engine speed is below the second predetermined engine speed and the aircraft is below the second predetermined altitude;
      (iii) engine speed falls below the interpolation when the aircraft is between the first and second predetermined altitudes.

4. A method according to claim 3, and further comprising:
   maintaining cooling airflow, irrespective of the three conditions of step (d)(i), (ii) and (iii), when the blade temperature exceeds a first temperature; and
   terminating cooling airflow when the blade temperature falls below the first temperature by a predetermined amount.

5. In an aircraft having a gas turbine engine containing a valve which controls cooling airflow to turbine blades, the improvement comprising:
   (a) speed sensor means for producing an actual speed signal indicative of the rotational speed of a predetermined engine component;
   (b) pressure sensor means for producing a pressure signal indicative of the altitude of the aircraft;
   (c) temperature sensor means for producing a blade temperature signal indicative of the temperature of the turbine blades;
   (d) scheduling means coupled to both sensor means of (a) and (b) for producing a threshold speed signal as a function of the actual speed signal and the pressure signal;
   (e) servo means for
      (i) comparing the threshold speed signal with the actual speed signal and opening the valve when the actual speed exceeds the threshold speed;
      (ii) comparing the blade temperature signal with a first temperature limit and opening the valve when the blade temperature exceeds the first temperature limit;
      (iii) comparing the blade temperature signal with a second temperature limit and in response
         (A) closing the valve when the blade temperature falls below the second limit and
         (B) maintaining the valve in its present state, i.e., either open or closed, when the blade temperature is above the second limit.

6. An apparatus for controlling cooling airflow for turbine blades in an aircraft gas turbine engine, comprising:

a means for producing a signal related to the rotational speed for a predetermined engine component;

a means for producing a signal related to the altitude of the aircraft;

a means for producing a signal related to the temperature of the turbine blades; and a means connected to the speed, altitude, and temperature signal producing means for modulating the cooling airflow for the turbine blades.

* * * * *